United States Patent [19]
Ferracina

[11] Patent Number: 5,924,892
[45] Date of Patent: Jul. 20, 1999

[54] DEVICE FOR ELECTRICALLY POWERING A PLURALITY OF USER ITEMS PROVIDED WITH THEIR OWN ELECTRICAL FEED AND DATA TRANSFER CABLES, TO AT LEAST PARTIALLY CONTAIN THESE CABLES DURING SAID FEED

[76] Inventor: Paolo Ferracina, Chesa Polascin, 7505 Celerina, Switzerland

[21] Appl. No.: 08/931,139

[22] Filed: Sep. 16, 1997

[30] Foreign Application Priority Data

Apr. 1, 1997 [IT] Italy .................................. MI97A0749

[51] Int. Cl.$^6$ ..................................................... H01R 13/72
[52] U.S. Cl. ........................................... 439/501; 439/535
[58] Field of Search .................................. 439/501, 456, 439/528, 457, 577, 464, 471, 535; 191/12.2 R

[56] References Cited

U.S. PATENT DOCUMENTS

| | | | |
|---|---|---|---|
| 3,821,496 | 6/1974 | Malone | 191/12.2 R |
| 4,731,029 | 3/1988 | Lerner et al. | 439/4 |
| 4,944,694 | 7/1990 | Dorn | 439/501 |
| 5,379,903 | 1/1995 | Smith | 211/13 |
| 5,596,479 | 1/1997 | Campbell et al. | 361/643 |
| 5,690,198 | 11/1997 | Lohr | 191/12.2 R |

FOREIGN PATENT DOCUMENTS 2698729  6/1994  France .

*Primary Examiner*—Gary Paumen
*Assistant Examiner*—Alexander Gilman
*Attorney, Agent, or Firm*—Christie, Parker & Hale, LLP

[57] ABSTRACT

A device (1) for electrically powering a plurality of user items, such as a processor, the modem connected thereto, its printer, its video monitor, and other user items connected or not connected to said processor, such as lamps, calculators etc., or household electrical appliances or working instruments, said user items being provided with their own electrical feed cable (13). The device comprises a box casing (2) provided with an inner compartment (3) and a plurality of access apertures (12, 90) to said compartment (3) when the casing (2) is closed, in this latter there being provided means (25) for electrically powering said user items and means (15) for at least partially gathering said feed cables (13) within said casing.

19 Claims, 3 Drawing Sheets

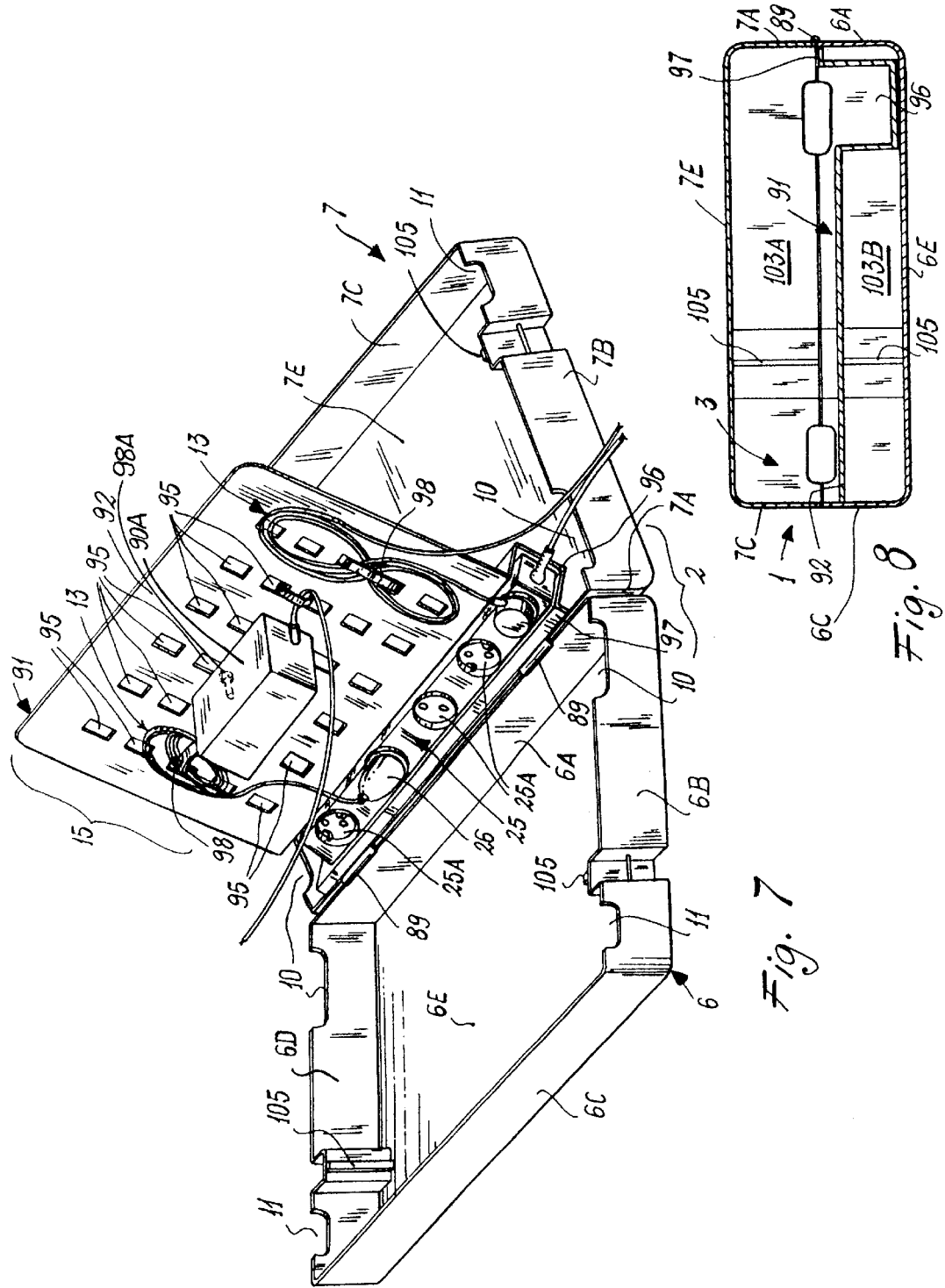

DEVICE FOR ELECTRICALLY POWERING A PLURALITY OF USER ITEMS PROVIDED WITH THEIR OWN ELECTRICAL FEED AND DATA TRANSFER CABLES, TO AT LEAST PARTIALLY CONTAIN THESE CABLES DURING SAID FEED

This invention relates to a device in accordance with the introduction to the main claim.

As is well known, a processor, the user items connected to it, and other objects (such as a lamp, an electrical calculator etc.) usually existing on a working table or desk or in a domestic or working environment in general in which a plurality of electrically powered members are present (such as a television set, a video-recorder or a plurality of working tools), are each provided with their own electrical power cable or data transfer cable. At least some of these cables are connected to a multiple socket or to various electrical power points deriving from the electricity mains in the room in which the desk is positioned. The totality of these cables extending from the various user items can be arranged in a more or less ordered manner on one side of the desk or under it, but this can still cause various problems for persons moving about in said room. For example it is possible to stumble into said cables, which is dangerous both from the physical viewpoint for the person stumbling, and from the electrical viewpoint for the user item whose cable the person has disturbed.

An object of the present invention is to provide a device for electrical powering a plurality of user items provided with their own electrical feed cable and which enables these cables and the data transfer cables to be grouped in such a manner as to avoid the aforesaid problems.

A particular object of the invention is to provide a device of the aforesaid type offering considerable safety in the workplace both for those persons assigned to the aforesaid user items and to persons who occasionally have to approach them.

A further object is to provide a device of the aforesaid type which is compact, is easily used, can be positioned at various points on the working desk, and is safe and reliable during use.

These and further objects which will be apparent to the expert of the art are attained by a device in accordance with the accompanying claims.

The present invention will be more apparent from the accompanying drawing, which is provided by way of non-limiting example and in which:

FIG. 7 is a perspective view of a further embodiment of the invention; and

FIG. 8 is a longitudinal side section of the embodiment of FIG. 7 in its closed position with some parts omitted for better clarity.

Figure 1:
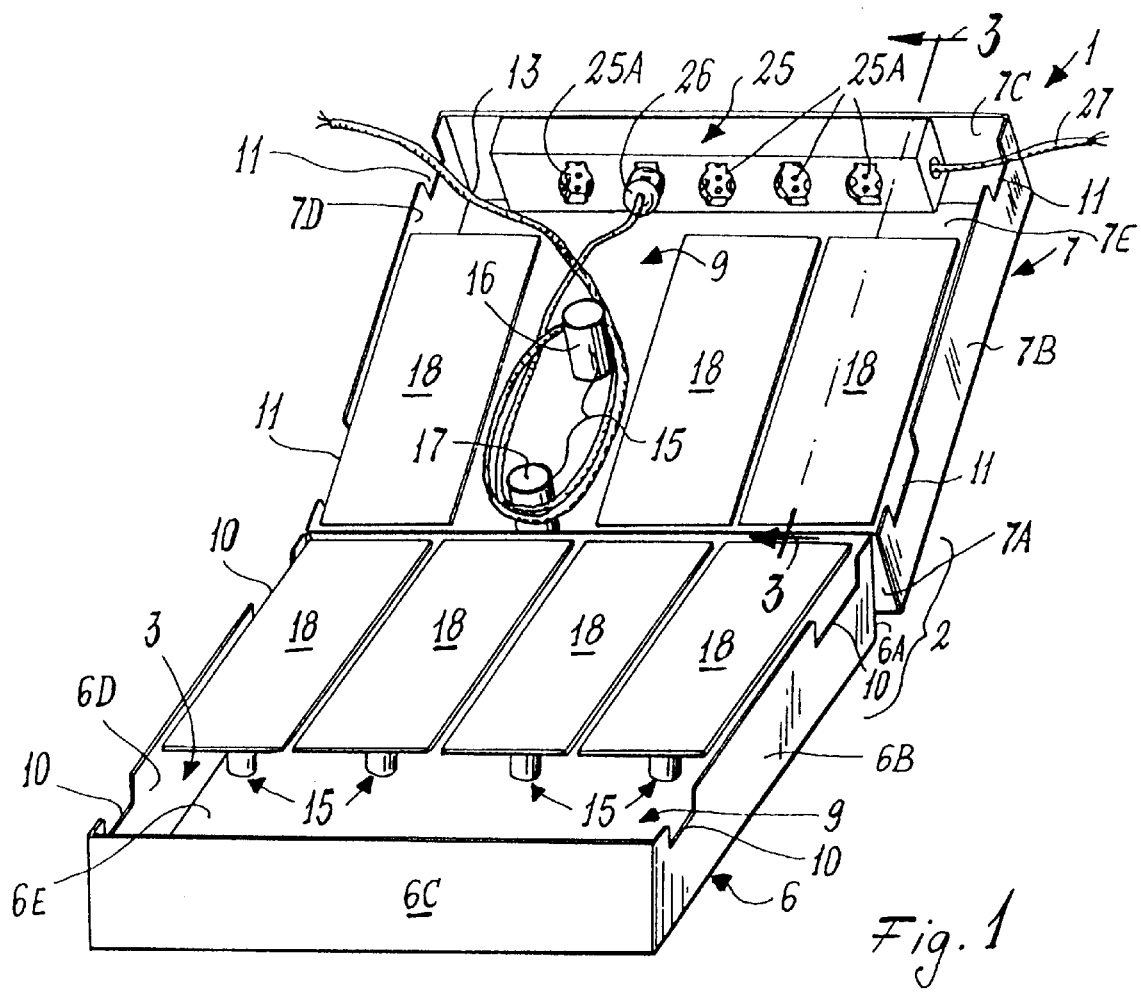
FIG. 1 is a perspective view of the device of the invention in its open position.
Figure 2:
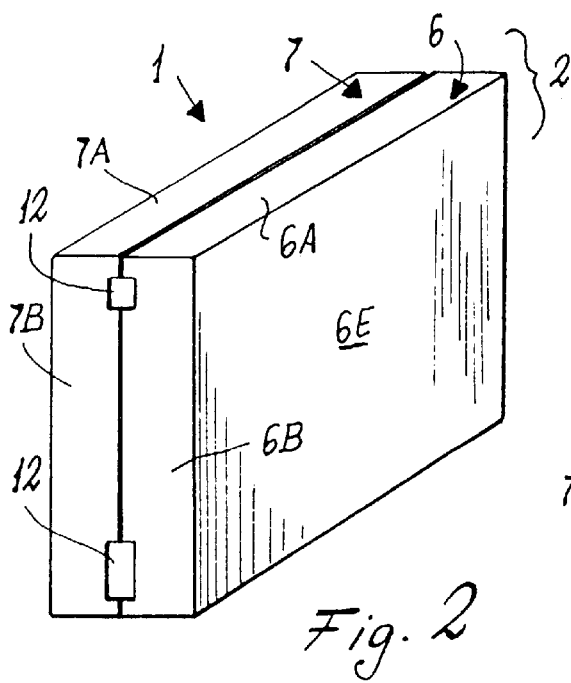
FIG. 2 is a perspective view of the device of FIG. 1 in its closed position.
Figure 3:
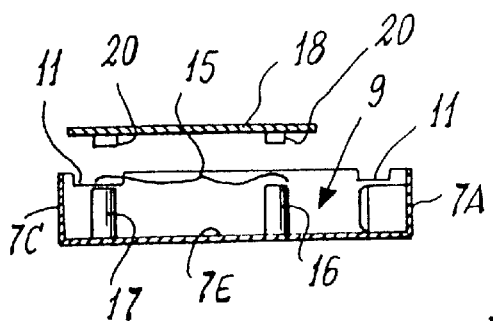
FIG. 3 is an exploded view showing a section on the line 3—3 of FIG. 1, with some parts omitted for greater clarity.

With reference to FIGS. 1 to 3, the device of the invention is indicated overall by 1 and comprises a casing 2. It is of box type, in the sense that it comprises an inner compartment 3 closed on all its sides by a movable (or closure) wall or element and fixed walls, the movable wall allowing access to the compartment 3. In the embodiment shown in the figures, the casing 2 comprises two portions 6 and 7 hinged together along corresponding walls 6A and 7A and fixable in the closed position by fastening members (hooks or the like) not shown. The portion 7 will be assumed to be the said movable or closure member, although this is purely for descriptive simplicity, in that this portion can be exchanged (in its function) with the portion 6.

In addition to the stated walls, said portions also comprise walls 6B, C, D and 7B, C, D rising from flat parts 6E and 7E respectively. In this manner, cavities 9 are defined within the portions 6 and 7.

In the walls 6B and 6D and in the walls 7B and 7D there are provided apertures or recesses 10 and 11 respectively, which when the casing is closed meet to create passages 12 through the casing walls. Electrical and/or data transfer cables 13 (only one shown in the figure) pass through these passages from the casing 2, for example to electrically power the user items such as a processor, a printer or other units associated with it (video monitor, optical disk reader, etc.), a table lamp, an electrical calculator or another user item usually positioned on a working table, desk or the like. The cables 13 are arranged to be at least partially contained within the casing 2 by arranging means 15 therein for their gathering and retention.

Specifically, said means (in the embodiment shown in the figures) are cylindrical members 16 and 17 positioned spaced apart and associated with the flat parts 6E and 7E of the portions 6 and 7. Said cables can be arranged about these members 16 and 17 (as in the example shown in FIG. 1) for their containment within the casing 2. A movable element 18 (and completely removable in the example) can be fitted (for example by pressing) to said members 16 and 17 to reliably retain the cable 13 would about them and to properly separate from each other the cables associated with the members 16 and 17 of both the parts 6E and 7E. This fitting is achieved by mounting on said members hollow cylindrical portions 20 of the element 18. In particular, the members 16 and 17 are hollow (or tubular) and receive the elements 18 within them.

Within the casing 2 there is provided, in a preferably fixed manner, a multiple socket 25 able to receive the electrical connection elements (plugs) 26 associated with the cables for electrically powering the user items. The multiple socket 25 is associated with the wall 7C of the portion 7 and can be connected to the electricity mains of the room by a connection cable 27 which emerges from the casing 2 via one of the passages 12 present in its walls. The multiple socket 25 comprises a plurality of sockets 25A which can be of different form according to requirements, for example universal bypass/shuko or others, in accordance with the various standards (for example European, USA or Japanese).

The device of the invention is simple to use. Those cables 13 of the user items to be grouped within the casing 2 are arranged about the members 16 and 17 (the electrical feed cables having been previously connected to the multiple socket 25), and are locked in these positions by fitting the elements 18 to said members. The multiple socket 25 is then connected to the mains and the portion 7 is closed onto the portion 6. The casing 2 is then positioned in proximity to the working surface, desk or the like. For example it can be fixed to said working surface or be placed at the feet of the desk.

In this manner, by virtue of the device of the invention, all cables associated with electrically powered user items and all data transfer cables are grouped in a precise point of the desk or the like, and only one electrical cable extends from it to reach the electricity mains. This provides considerable safety in the use of the user items and prevents undesirable contact with said cables, by providing appreciable order about the desk or working surface.

By virtue of the elements 18 (preferably of insulating or plastic material), the cables are separated from each other so that cables of different characteristics such as electrical feed cables and data transmission cables can be inserted into the casing 2, without any electrical interference occurring between them.

Advantageously the means 15 can be automatic winders, allowing automatic winding and automatic unwinding of the cables within the casing 2.

In addition, if the device 1 is positioned in the vicinity of a user item, then at least one electrical cable (its feed cables) is nearly totally inserted in the casing 2.

A preferred embodiment of the invention has been described. Others are however possible and are to be considered as falling within the scope of the present invention. For example the device 1 can be used to contain cables of household electrical appliances or of the electrical equipment in a domestic room (such as a television set, a video-recorder, a high fidelity installation etc.) or the cables of working instruments or of a plurality of electrical machines present in a generic workplace. These uses are also included within the present document.

Figure 4:
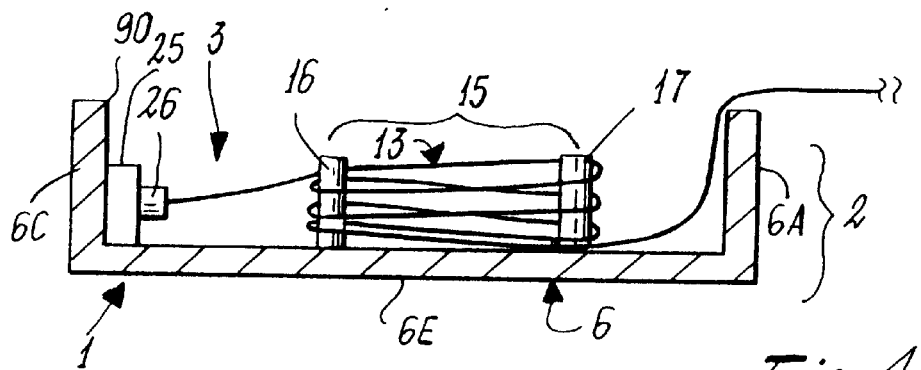
FIG. 4 is a longitudinal side section through a modification of the invention.
Figure 5:
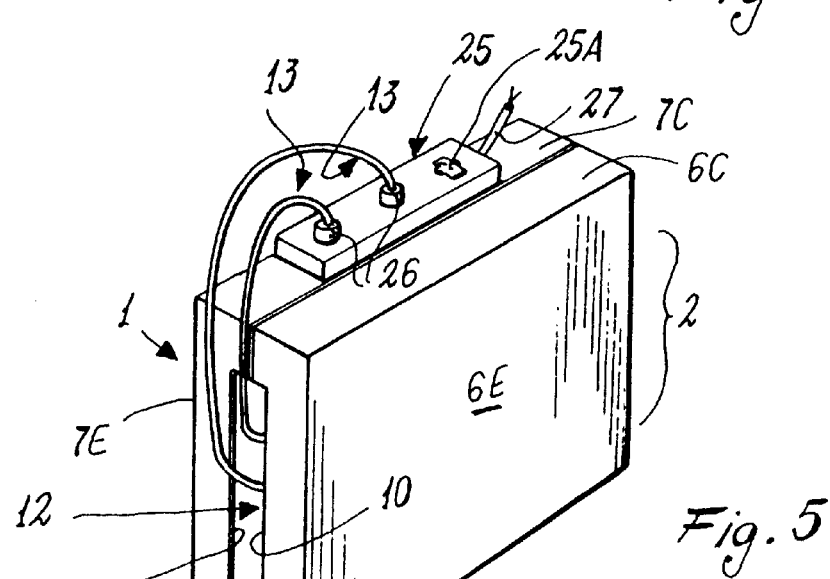
FIG. 5 is a perspective view of a further modification of the invention.
Figure 6:
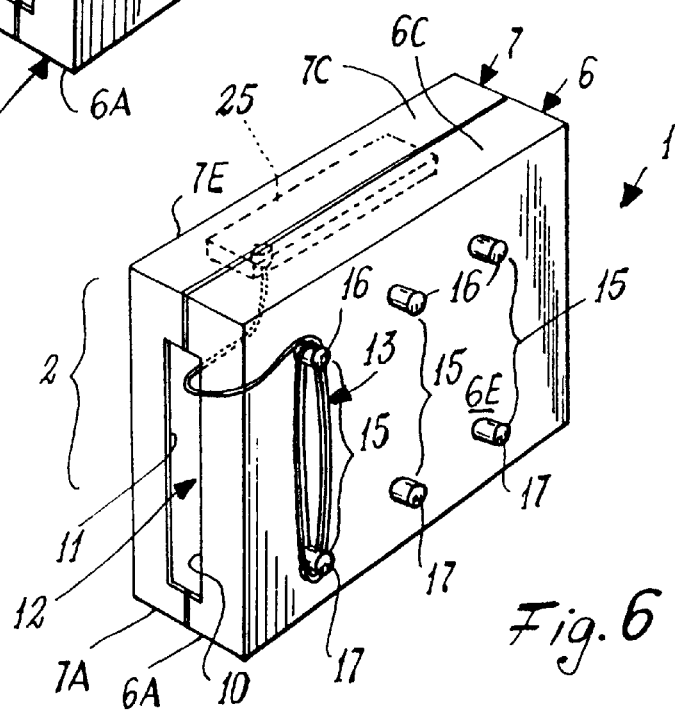
FIG. 6 is a perspective view of another modification of the invention.

FIGS. 4, 5 and 6 show modifications of the invention. In these figures, parts corresponding to those already represented and described in FIGS. 1 to 3 are indicated by the same reference numerals.

Specifically, in FIG. 4, the device 1 comprises a casing 2 not of box configuration, but open upperly (and possibly also laterally, as shown). In it the cables 13 (only one being shown) are wound about the cylinders 16 and 17 (shown) and the relative plug is inserted into the socket 25. In FIG. 4 no element 18 associated with said cylinders is shown, but such an element is to be considered present. Access to the inner compartment 9 is via the upper aperture 90 of the casing 2.

In FIG. 5, the device 1 has the multiple socket positioned on the outside of the casing 2 on a wall 7C of the casing 2, the cables being wound about devices 15 (not shown) within said casing, which is of box type.

In FIG. 6 the device 1 has a box casing 2 but has the devices 15 positioned externally on a flat face 6E of said casing, the multiple socket being inside the casing. Movable elements 18, not shown, are associated with these devices.

FIGS. 7 and 8 show a further embodiment of the invention. In these Figures, parts corresponding to those already represented and described in FIGS. 1 to 6 are indicated by the same reference numerals.

Specifically, in the above cited FIGS. 7 and 8 the device 1 comprises the box-type casing 2 with portions 6 and 7 hinged together (in 89) along their walls 6A and 7A. Casing 2 is substantially shaped as casing 2 of FIGS. 1 to 3; however, according to the present embodiment of the invention, flat parts 6E and 7E of portions 6 and 7 do not present any means 15 for gathering and retaining the electrical and/or data transfer cables.

In the embodiment, said means 15 are a movable support member 91 (advantageously of plastic material) hinged at least to one of portions 6 and 7 or to the hinges 89 between the latter. The support member 91 (or simply support 91) comprises a plane or flat portion 92 to which cables 13 and any other electrical device such a transformer 90A which is needed for the use of the user items. The plane portion above cited has a plurality of holes 95 suitable for cooperating with elements 98 for gathering cables 13, such as clamping means, wires or similar connected to support 91 through holes 95. The holes are also suitable for cooperating with connecting elements such as screws or bolts (not shown) suitable for connecting electrical devices 90A to support 91.

The latter is provided with a concave portion or groove 96 located at its end portion 97; the groove is suitable for housing multiple socket 25 which is connected to the movable support by any fixing means such as screw, glue or similar.

According to the invention as shown in FIGS. 7 and 8, inner compartment 3 of box 2 is divided into two portions 103A and 103B in which two different kind of cables or electrical devices can be located; for example, portion 103A houses electrical cables and the electrical devices, portion 103B housing the data transfer cable. Furthermore, in order to keep support 91 in a substantially retained position, portions 6 and 7 of box 2 are provided with flaps 105 protruding into cavity 3 from walls 6B, 6D and 7B, 7D of said portions. The flaps cooperate with support 91 and do not allow any movement of it which could cause damages to the electrical devices it supports or the disconnection of the cables 13 from it.

These embodiments, together with others which can derive from the aforegoing description (such as one in which the already wound cables are retained within the casing 2 by retention means present therein) are to be considered as falling within the scope of the present invention.

I claim:

1. A device for electrically powering a plurality of user items, said user items being provided with their own electrical feed and/or data transfer cable (13), said device comprising a casing (2) provided with an inner compartment (3) and at least one access aperture (12, 90) to said compartment (3), said casing comprising associated means (25) for electrically powering said user items and means (15) for gathering and/or retaining said cables (13);

cover elements (18) for the cables secured by the means for gathering and/or retaining(15).

2. A device as claimed in claim 1, wherein the cover elements (18) are removably associated with the means (15) for gathering and/or retaining the cables (13).

3. A device as claimed in claim 1, wherein the compartment (3) of the casing (2) is closed upperly, said casing (2) being of box type.

4. A device as claimed in claim 1, wherein the casing (2) comprises two portions (6, 7) closable one onto the other and defining an internal cavity (3) within said casing (2), said portions (6, 7) comprising a plurality of walls (6A, 6B, 6C; 7A, 7B, 7C, 7D) extending perpendicularly from a corresponding flat part (6E, 7E) with which the means (15) for gathering the user cables (13) are associated.

5. A device as claimed in claim 4, wherein said portions (6, 7) are hinged together along respective walls (6A, 7A) and are fixable in the closed position one on the other by fastening members.

6. A device as claimed in claim 4, wherein the at least one access aperture (12) is provided within at least one of the walls (6B, 6D; 7B, 7D) of each portion (6, 7) of said casing.

7. A device as claimed in claim 6, wherein the at least one access aperture (12) is defined by the meeting of recesses (10, 11) provided in walls (6B, 6D; 7B, 7D) of the portions (6, 7) of the casing (2) and arranged to be brought into contact by the closure of said portions one on the other.

8. A device as claimed in claim 1, wherein the means (15) for gathering and/or retaining the cables (13) and the means

(25) for powering the user items, at least one is positioned within the compartment (3) in the casing (2).

9. A device as claimed in claim 8, wherein the means (25) for powering the user items is positioned on an outer face (7C) of the casing (2).

10. A device as claimed in claim 8, wherein the means (15) for gathering the cables (13) is associated with a face (6E) of the casing.

11. A device as claimed in claim 1, wherein the means for powering the user items comprises a plurality of sockets (25A) associated with a wall (7C) of the casing (2).

12. A device as claimed in claim 11, wherein the plurality of sockets (25A) comprise a multiple socket (25).

13. A device as claimed in claim 1, wherein the means for gathering and/or retaining the cables (13) comprise a plurality of members (16, 17) associated with the casing (2) and about which the corresponding cables (13) are wound.

14. A device as claimed in claim 13, wherein the means for gathering and/or retaining the cables (13) comprise pairs of spaced-apart members (16, 17) extending perpendicularly from a flat part (6E, 7E) of the casing (2).

15. A device for electrically powering a plurality of user items, said user items being provided with their own electrical feed and/or data transfer cable (13), said device comprising a casing (2) provided with an inner compartment (3) and at least one access aperture (12, 90) to said compartment (3), said casing comprising associated means (25) for electrically powering said user items and means (15) for gathering and/or retaining said cables (13), wherein the means for gathering and/or retaining the cables (13) comprises a support member (91) which comprises a plane portion (92) provided with elements (95) adapted for gathering and retaining said cables and/or electrical devices, said support member (91) being hinged to at least a wall (6A, 7A) of the casing (2).

16. A device as claimed in claim 15, wherein the gathering and retaining elements are a plurality of holes (95) suitable for cooperating with gathering elements (98) for gathering the cables (13) and with connecting elements for retaining the electrical devices (90A).

17. A device as claimed in claim 15, wherein comprising means (105) for avoiding large movements of the support member (91) relative to the walls of the casing (2).

18. A device as claimed in claim 15, wherein the support member (91) supports the means (25) for powering the user items.

19. A device as claimed in claim 18, wherein the means (25) for powering the user items are located in a seat (96) of the support member (91).

* * * * *